(12) United States Patent
Acquaderni et al.

(10) Patent No.: US 12,179,304 B2
(45) Date of Patent: Dec. 31, 2024

(54) METHOD FOR MEASURING OPERATING PARAMETERS OF A MACHINING OF A SURFACE AND A DEVICE FOR MEASURING OPERATING PARAMETERS

(71) Applicant: S.I.T. SOCIETA' ITALIANA TECNOSPAZZOLE S.P.A., Casalecchio di Reno (IT)

(72) Inventors: Alessandro Acquaderni, Bologna (IT); Manuel Acquisti, Anghiari (IT); Alessandro Checchi, Cento (IT); Allioua Chemseddine, Bologna (IT); Jessica Longhin, Carbonera (IT); Gianluca Micheli, Trento (IT); Giuliana Navarra, Alcamo (IT); Giulia Tizi, Ostuni (IT); Federica Zerbini, Ozzano Dell'Emilia (IT)

(73) Assignee: S.I.T. Societa' Italiana Tecnospazzole S.p.A., Casalecchio di Reno (IT)

( * ) Notice: Subject to any disclaimer, the term of this patent is extended or adjusted under 35 U.S.C. 154(b) by 434 days.

(21) Appl. No.: 17/563,811

(22) Filed: Dec. 28, 2021

(65) Prior Publication Data

US 2022/0219276 A1    Jul. 14, 2022

(30) Foreign Application Priority Data

Jan. 12, 2021    (IT) .................. 102021000000488

(51) Int. Cl.
*B23Q 17/20*    (2006.01)
*B23Q 3/10*    (2006.01)

(52) U.S. Cl.
CPC .............. *B23Q 17/20* (2013.01); *B23Q 3/10* (2013.01); *B23Q 2717/00* (2013.01)

(58) Field of Classification Search
CPC ...... B23Q 17/20; B23Q 3/10; B23Q 2717/00; B24B 9/007; G01D 21/02; G05B 19/0428; G05B 2219/2612
See application file for complete search history.

(56) References Cited

U.S. PATENT DOCUMENTS

| 2010/0049352 A1* | 2/2010 | Kohlmaier | ............ B25J 9/1633 901/41 |
| 2012/0309279 A1* | 12/2012 | Okoshi | ................... B24B 9/007 451/381 |

(Continued)

FOREIGN PATENT DOCUMENTS

| CN | 107443196 A | 12/2017 |
| CN | 110860959 A | 3/2020 |

(Continued)

OTHER PUBLICATIONS

Italian Search Report dated Sep. 20, 2021 from counterpart Italian Patent Application No. 102021000000488.

*Primary Examiner* — Eyob Hagos
(74) *Attorney, Agent, or Firm* — SHUTTLEWORTH & INGERSOLL, PLC; Timothy J. Klima

(57) ABSTRACT

Described is a method for measuring operating parameters of a machining of at least one surface of a semi-finished component including the step of preparing a group of brushes; the step of preparing a line for the passage of the semi-finished components; the step of preparing a data acquisition and processing unit; the step of associating at least one measuring device in an integral fashion with the semi-finished component; the step of positioning on the line the semi-finished component; the step of machining the semi-finished component; the step of measuring a plurality of operating parameters of the machining performed during (Continued)

the machining step; the step of sending at least one signal representing said operating parameters to the data acquisition and processing unit.

13 Claims, 3 Drawing Sheets

(56) References Cited

U.S. PATENT DOCUMENTS

| | | | | |
|---|---|---|---|---|
| 2013/0203320 A1* | 8/2013 | Ghalambor | ............. | B24C 1/083 |
| | | | | 451/2 |
| 2018/0348730 A1* | 12/2018 | Reekmans | ............. | B25J 9/1671 |
| 2020/0254579 A1* | 8/2020 | Bunn, Sr. | ................ | B24B 9/007 |

FOREIGN PATENT DOCUMENTS

| | | | | | |
|---|---|---|---|---|---|
| CN | 110814911 B | * | 5/2021 | ......... | B24B 27/0076 |
| EP | 2796242 A2 | * | 10/2014 | ........... | B24B 27/033 |
| WO | 2016116812 A1 | | 7/2016 | | |

* cited by examiner

METHOD FOR MEASURING OPERATING PARAMETERS OF A MACHINING OF A SURFACE AND A DEVICE FOR MEASURING OPERATING PARAMETERS

This application claims priority to Italian Patent Application 102021000000488 filed Jan. 12, 2021, the entirety of which is incorporated by reference herein.

BACKGROUND OF THE INVENTION

This invention relates to a method for measuring operating parameters of a machining of a surface.

The invention also relates to a device for measuring operating parameters of a machining of a surface.

More specifically, the invention is applicable in particular in the field of deburring/removal of material from semi-finished components, made from metal or wood, having at least one surface which has been subjected to cutting operations.

In industrial production plants, the prior art teaches the production of large elements or pieces, which may be continuous, and the obtaining of the components with commercial dimensions by means of cutting operations.

For example, in the plants for cutting metal pipes the semi-finished metal parts are machined to size as required by the customer.

However, after the action of the cutting units machining waste remains, such as burrs, at the surfaces on which these cutting units have acted.

This machining waste, as well as affecting the external appearance of the finished component, may be hazardous for the user who handles said finished component since the contact with the machined surfaces which are still rough could cause cuts and grazes.

In order to eliminate machining waste from the surfaces subject to cutting and improve the machining of the finished component, machining units are used, in industrial plants, which are equipped with tools for removing metal such as industrial brushes.

The industrial brushes are devices comprising an operating tool usually cylindrical in shape having a plurality of bristles, made of metal (steel) or synthetic, protruding radially from a cylindrical support.

The operating tool is connected to a drive shaft and rotated by a motor, preferably electric.

The contact between the bristles of the rotated brush and the surface previously subjected to cutting results in the removal of the burrs and gives the "deburred" surface the desired appearance for marketing.

The quality of the deburring operations is influenced by various factors, such as, for example, the speed of rotation of the brushes and especially the dimensional parameters of the machining unit, that is to say, the adjustment parameters which the machining unit must have for a correct operation.

The term "dimensional parameters" refers to the fact that the position of the brushes can be adjusted in such a way as to modify the distance between the bristles and workpiece and, therefore, the penetration of the brush into the object to be machined and, consequently, vary the friction between the surface and the bristles of the brush in order to achieve a more effective machining.

Currently, in the production systems, the setting up of the machining units equipped with brushes is not standardised and is performed in an empirical manner by operators with a high level of experience in the sector.

More specifically, as well as visual inspection of the surface machined, the noise produced by the machining is analysed in a non-automatic manner.

In other words, an expert operator is aware of the noise produced by the machining in progress and compares it only at the level of personal hearing experience with the theoretical noise produced by optimum machining, on the basis of the experience accumulated over time.

The subjective nature of this adjustment technique results in a reduced optimisation of the entire process for adjusting the machining of the surface, as well as the impossibility of assessing other important operating parameters.

Measuring solutions have been adopted over the years comprising sensors mounted close to the brushes, in order to measure their wear and efficiency of the machining.

One such solution of detecting operational parameters of measuring an edge of a tubular part is known from document WO2016/116812.

However, the large size of the plants and the presence of dust greatly deteriorate the effectiveness of these solutions, which cannot replace the users who are skilled in assessing the machining.

In that sense, there is a strongly felt need in the context of the machining of surfaces subject to cutting of having an effective method for assessing operating parameters of the machining which is not based on the subjective experience of an operator.

Another strongly felt need is that of being able to have a device which is able to measure in an objective and effective manner the operating parameters of a machining of a semi-finished component and provide information regarding the measurement to a user for a subsequent adjustment.

SUMMARY OF THE INVENTION

The aims of the invention are therefore to meet the above-mentioned requirements.

More specifically, the aim of the invention is to provide a method for measuring the operating parameters of a machining which is precise, objective and cannot be disturbed by the particular conditions of the environment in which the machining is performed.

Another aim of the invention is to provide a device for measuring the operating parameters of a machining which supports a user for optimum setting up of the machining and which is therefore effective in measuring said parameters, which is easy to use and intuitive for the user.

These aims and others, which are more apparent from the detailed description which follows, are achieved by a method and a device for measuring the operating parameters of a machining of a surface, comprising the technical features described in one or more of the appended claims.

BRIEF DESCRIPTION OF THE DRAWINGS

The technical features of the invention, with reference to the above-mentioned aims, are clearly described in the claims below and its advantages are more apparent from the detailed description which follows, with reference to the following drawings in which:

DESCRIPTION OF THE PREFERRED EMBODIMENTS

The following description describes a method for measuring operating parameters of a machining of a surface S.

More specifically, a method is described for measuring operating parameters of a surface (in particular, but without limiting the scope of the invention, the operating parameters of a deburring of the surface) of a semi-finished component T which has been previously subjected to a cutting operation.

Said semi-finished component T, depending on the industrial sector in which the method according to the invention is used, may adopt different shapes.

Again depending on the industrial sector in which the method according to this invention is used, the semi-finished component T may be made of various materials.

By way of example, the semi-finished component T could be a metal pipe, that is to say, a metal component having a hollow shape, preferably cylindrical.

Again by way of an example, the semi-finished component T could be a plank or panel made of wood, that is to say, a wooden component mainly planar in shape.

In this description particular reference is made to the machining of the ends of tubular semi-finished components T using brushes having particularly resistant bristles, preferably made of metal, for machining particularly resistant surfaces, for example metal, having imperfections resulting from previous cutting operations.

However, without limiting the scope of the invention, the measuring method according to the invention may be applied to the machining of semi-finished components T made of materials and shapes which are different from that shown below by way of example.

More specifically, the semi-finished component T comprises at least one surface S to be machined at a portion of the semi-finished component T which has been subjected to a cutting operation.

Generally, the result of these cutting operations is not of a quality such as to allow a ready marketing of the semi-finished component T, since imperfections they, such as burrs, on said at least one surface S at which the cutting elements have operated.

Figure 4:
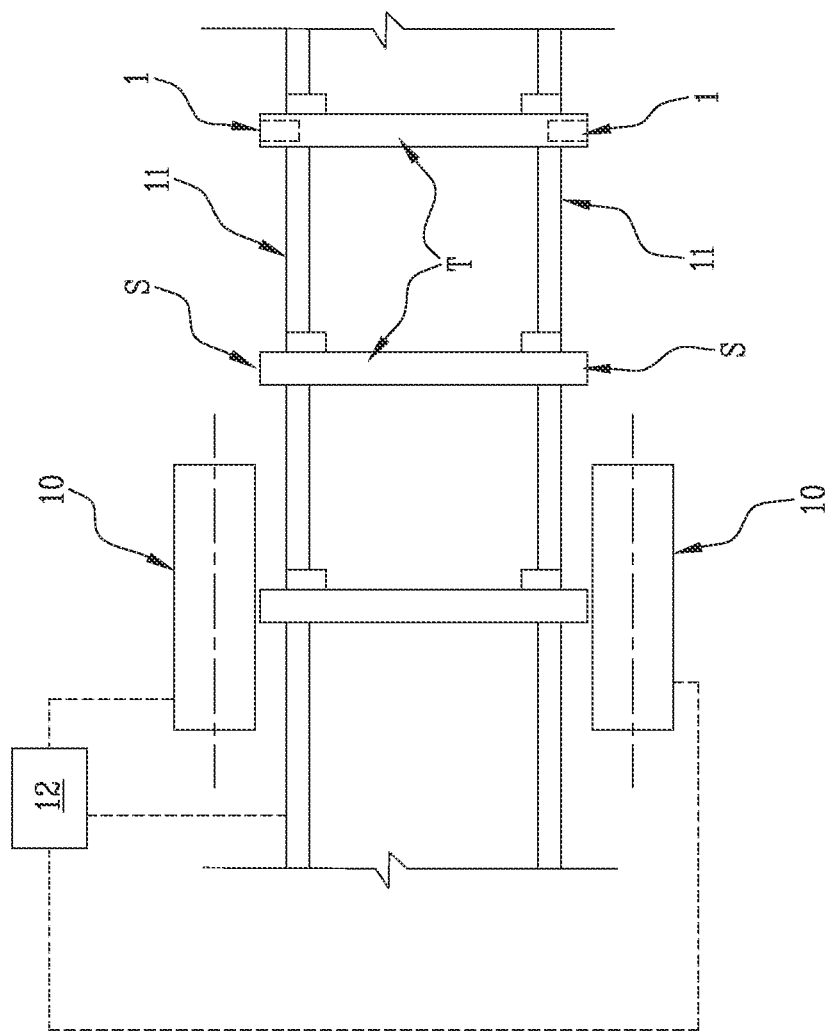
FIG. 4 illustrates the measuring device according to the invention in use during one of the steps of the measuring method also according to the invention.

In the example of machining tubular semi-finished components T, illustrated in FIG. 4, the latter have two end surfaces S, preferably annular in shape, on which the cutting members have acted and which therefore have residues of these operations, technically the above-mentioned burrs.

According to one aspect of this invention, the measuring method comprises a step of preparing at least one group of brushes 10 for machining surfaces S.

More specifically, the at least one group of brushes 10 is equipped with at least one brush comprising a plurality of bristles which are particularly resistant, preferably metal, protruding radially from a tubular core.

The at least one group of brushes 10 also comprises a motor, preferably electric, and a drive shaft connected to said motor to be rotated.

Each brush is configured to be mounted on said drive shaft and to be rotated by the action of the motor.

The group of brushes 10 is configured to machine the at least one surface S of the semi-finished component T by means of the contact between the surface S and the bristles of the brush in rotation.

In the embodiment of FIG. 4, that is to say, in the example of machining tubular semi-finished components T, the preparing step comprises preparing two groups of brushes 10 facing each other for machining the two end surfaces S of the tubular semi-finished component T.

Said at least one group of brushes 10 is adjustable at least in terms of a speed of rotation of the brush and of a position of the group of brushes 10 relative to the semi-finished component T.

The adjustment of the at least one group of brushes 10 determines the operational contact (pressure) between the bristles of the brush and the surface S of the semi-finished component T, and thus the effectiveness of the machining performed by the group of brushes 10.

An optimum adjustment of the at least one group of brushes 10 is crucial since, on the one hand, an operational contact which is insufficient would result in poor quality of the finished component, whilst, on the other hand, a friction which is too high would result in excessive consumption of the bristles of the brushes, their overheating resulting in a darkening of the surfaces which is aesthetically unacceptable.

In the embodiment of FIG. 4, that is to say, in the example of machining tubular semi-finished components T, the preparing step comprises preparing two groups of brushes 10 facing each other for machining the two end surfaces S of the tubular semi-finished component T.

In this embodiment, the distance between the two groups of brushes 10, usually called the centre-to-centre distance, is particularly important to define the distance between the motor shafts of the two groups of brushes 10.

The adjustment of the centre-to-centre distance is particularly crucial because it determines the penetration of the wires of the brushes into the surfaces of the tubular semi-finished components T and thus the intensity of the machining on the two end surfaces S of the semi-finished tubular components T.

According to another aspect of this description, the measuring method comprises a step of preparing a line 11.

More specifically, the measuring method comprises the step of preparing said line 11 for the passage of the semi-finished components T comprising at least one surface S to be machined with said at least one group of brushes 10.

In other words, the line 11 is configured to transport the semi-finished components T with the at least one surface S at the at least one group of brushes 10 in such a way that it can be machined by the brushes.

Preferably, the line 11 comprises a plurality of seats for the semi-finished components T, advantageously configured to minimise the movements of the semi-finished components T during transport and during machining by means of the at least one group of brushes 10.

In one embodiment, illustrated in FIG. 4, the line 11 is a conveyor belt with two parallel tracks.

According to other embodiments, not illustrated, the line 11 may consist of systems with rigid gripping arms and movable along a feed direction.

The measuring method also comprises a step of preparing a data acquisition and processing unit 12.

This data acquisition and processing unit 12 may be advantageously connected to a command and control unit.

Said unit 12 is operatively connected to said at least one group of brushes 10 and to said line 11.

Preferably, through the command and control unit, the control unit 12 may be connected to a user interface through which a user enters parameters for adjusting the at least one group of brushes 10 and the line 11.

The control unit is configured to send control signals representing adjustments entered by the user through the user interface to said at least one group of brushes 10 and to said line 11 as a function of the data measured and processed by the unit 12.

According to another aspect of this invention, the measuring method comprises a step of associating at least one measuring device 1 with said semi-finished component T.

More specifically, the associating step comprises the association of said at least one measuring device 1 in an integral fashion with the semi-finished component T close to the at least one surface S to be machined.

The measuring device 1 is configured for measuring at least one temperature parameter of the semi-finished component T and a movement parameter of the semi-finished component T.

In one embodiment, the measuring device 1 comprises at least one temperature sensor and one movement sensor, for example an accelerometer and/or a gyroscope.

Preferably, the semi-finished component T comprises a seat for positioning the measuring device 1 in a stable and secure fashion.

Advantageously, the associating step results in a positioning of the measuring device 1 directly on the semi-finished component T, in an integral fashion with it, which therefore allows a direct and more accurate measurement of one or more operating parameters.

More specifically, the step of associating the measuring device 1 in an integral fashion with the semi-finished component T allows a more accurate measurement of one or more operating parameters compared with the prior art for positioning sensors on the group of brushes 10 or on the line 11.

Again advantageously, the positioning of the measuring device 1 directly on the semi-finished component T makes it possible to minimise the impact on the measuring device 1 of the surrounding environment in which the group of brushes 10 and the line 11 are installed.

In this way, the measurements taken by the measuring device 1 will only be conditioned by the actual state of the semi-finished component T.

In the embodiment of FIG. 4, that is to say, in the example of the machining of tubular semi-finished components T, the step of positioning at least one measuring device 1 comprises the positioning of two measuring devices 1, each close to one of said two end surfaces S of the tubular semi-finished component T.

Preferably, the two measuring devices 1 are positioned inside the tubular semi-finished component T, that is to say, in the cavity of the tubular element which therefore represents the seat for the measuring devices 1, as shown in FIG. 4.

The measuring method then comprises a step for positioning on said line 11 the semi-finished component T to which the at least one measuring device 1 has been associated.

Following the positioning step, the semi-finished component T to which the at least one measuring device 1 has been associated can be carried to the at least one group of brushes 10 so that, advantageously, the at least one surface S can be machined by the at least one brush.

Subsequently, the measuring method comprises a step of machining said at least one surface S using said at least one group of brushes 10.

The machining step is configured for eliminating, preferably through the brushes placed in rotation of the at least one group of brushes 10, the imperfections (or burrs) present on the at least one surface S following the cutting operations.

In this way, advantageously, its finished appearance is given to the semi-finished component T and the safety for a user who handles the component is guaranteed.

According to another aspect of this description, the measuring method comprises a step of measuring, using the measuring device 1, a plurality of operating parameters of the machining performed during the machining step.

More specifically, the measuring step comprises measuring at least one temperature parameter of the semi-finished component T and a movement parameter of the semi-finished component T.

Advantageously, the association of the measuring device 1 directly on the semi-finished component T, preferably inside a seat included in the semi-finished component T, allows a particularly precise measurement of the temperature.

Again advantageously, the association of the measuring device 1 in an integral fashion with the semi-finished component T allows a particularly precise measurement of the movements.

In this description, the term "movement parameter" is used to mean translations, vibrations, oscillations and rotations of the semi-finished component T whilst it is moved along the line 11 and is machined by the at least one group of brushes 10.

Preferably, the measuring step comprises measuring, by means of the measuring device 1, at least said temperature parameter and said at least one movement parameter of the element for at least a part of a duration of the machining step.

In other words, the measuring step comprises continuously measuring over time, or preferably a plurality of discrete measurements over time, said temperature parameter and said at least one movement parameter for at least part of the duration of the machining step.

Advantageously, with respect to the use of a single spot measurement, by using several measurements at different moments in time it is possible to monitor in a more accurate manner the operating parameters during the machining step.

According to another aspect, the measuring method comprises a step of sending, by the measuring device 1, at least one signal representing said operating parameters measured in the measuring step to said data acquisition and processing unit 12.

Preferably, the sending step comprises sending said signal representing the operating parameters measured by a wireless connection, still more preferably by means of a Bluetooth type connection.

Again preferably, the sending step comprises sending said signal representing operating parameters measured at the end of the machining step.

Preferably, the measuring method comprises a step of processing, by said unit 12, said signal representing said operating parameters measured in the measuring step and sent during the sending step.

More specifically, in the processing step, the unit 12 processes, by means of signal processing techniques not described, the signal representing said operating parameters received from the measuring device 1 and derives other derived quantities for analysing the machining.

Again preferably, the measuring method comprises a step of comparing, by said unit 12, a result of said processing step.

In one embodiment, during the comparing step, the unit 12 compares the derived quantities calculated during the processing step with optimum operating intervals for said quantities.

These optimum operating intervals are intervals predetermined on an empirical basis, collecting and cataloguing the data resulting from the machining of tests and then optimising the duration of the intervals.

Preferably, lastly, the measuring method comprises a step of signalling as a function of a result of said comparing step.

According to the embodiment described above, the signalling step comprises the emission of a positive signal if the derived quantities calculated during the processing step fall within the optimum operational intervals for said quantities and the emission, on the other hand, of a negative signal.

According to an embodiment, the signalling step comprises the signalling by means of an acoustic stimulation, emitting a different acoustic stimulus if the comparison step has given a positive or negative result.

According to another embodiment, the signalling step comprises signalling by means of a visual stimulus, for example using a screen or a two-coloured lamp, with the emission of a different visual stimulus if the comparison step has given a positive or negative result.

On the basis of said signalling, the operator responsible for setting the machining parameters may adjust these parameters in order to obtain optimum machining using the command and control unit.

Advantageously, the measuring method described in this invention allows a measurement of the operating parameters of a precise and objective machining which cannot be disturbed by the particular conditions of the environment in which the machining is performed.

Figure 1:
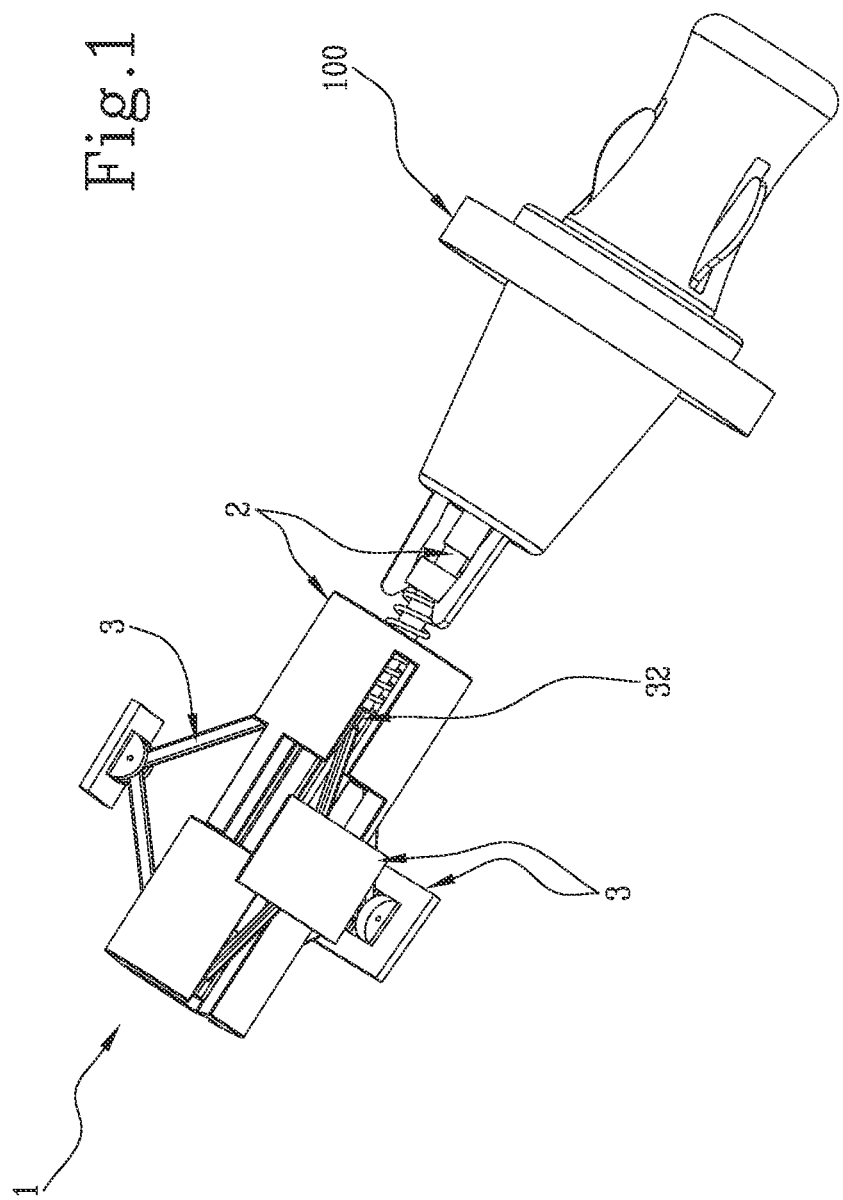
FIG. 1 is a simplified perspective view of a preferred, non-limiting example embodiment of the measuring device according to the invention.
Figure 2:
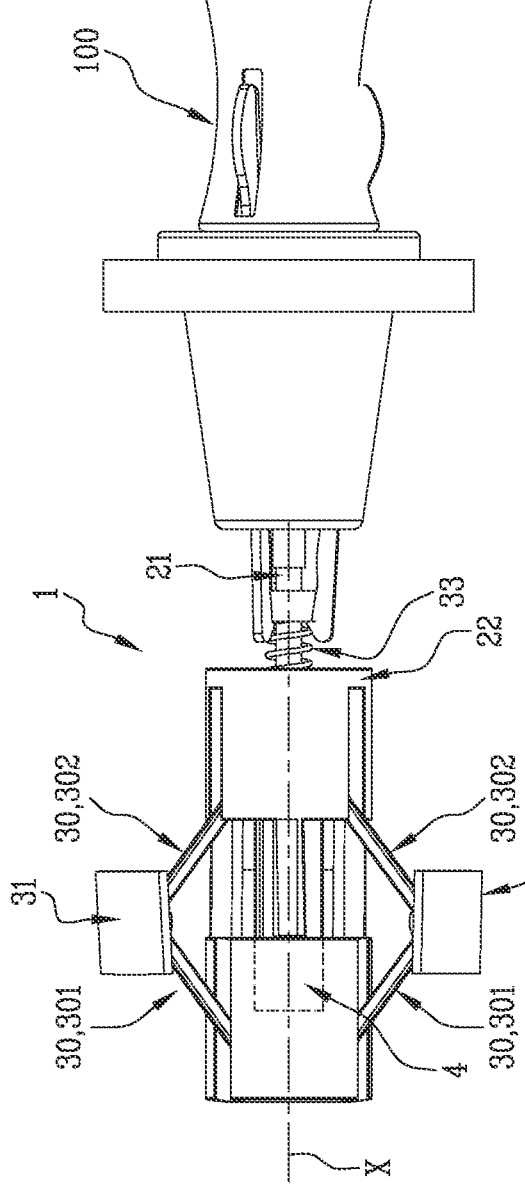
FIG. 2 is a front view of the measuring device of FIG. 1.
Figure 3:
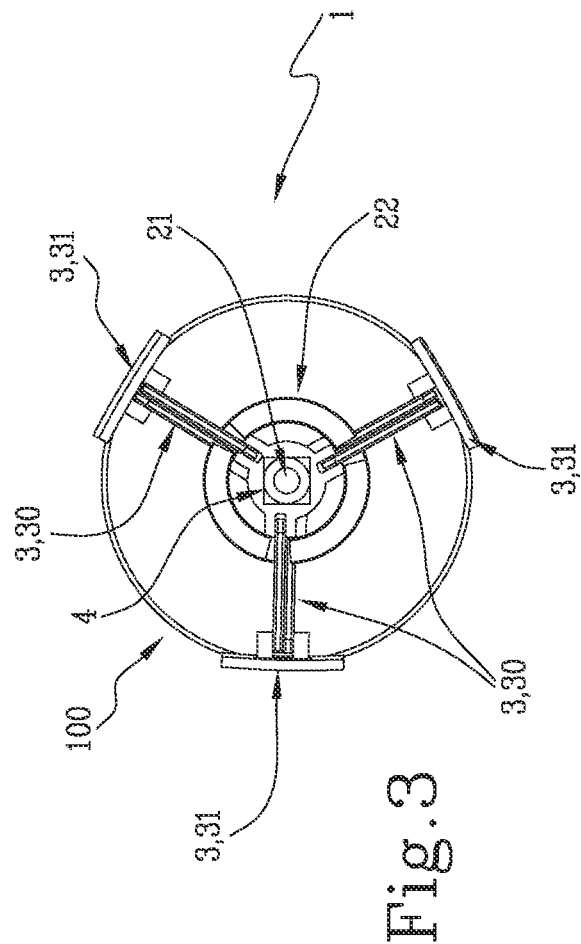
FIG. 3 is a top view of the measuring device of FIG. 1.

The invention also relates to a measuring device 1, illustrated in FIGS. 1 to 3 in a particularly suitable embodiment for inserting the measuring device 1 inside a tubular semi-finished component T.

The measuring device 1 is configured for measuring operating parameters of a machining of at least one surface S of the semi-finished component T.

More specifically, the semi-finished component T has been previously subjected to a cutting operation and has, at the at least one surface S, imperfections such as burrs, which can be eliminated by machining using industrial brushes.

Advantageously, the measuring device 1 is configured to be associated, preferably in an integral fashion, with the semi-finished component T for measuring said operating parameters.

As illustrated, the measuring device 1 comprises a frame 2 (or casing).

The frame 2 is configured to support and protect other elements which make up the measuring device 1 and which are described below.

According to the embodiment shown in FIGS. 1 to 3, the frame 2 comprises a central rod 21 having a longitudinal axis X of extension.

According to one embodiment, the central rod 21 is made of a metallic material, for example steel.

According to another embodiment, the central rod 21 is made of plastic material, for example ABS.

The central rod 21 is configured to support and guide the movement of the remaining elements which will be described for the particular embodiment shown in FIGS. 1 to 3.

Preferably, again as illustrated in FIGS. 1 to 3, the frame 2 comprises a sleeve 22.

More specifically, the sleeve 22 is configured to protect part of the other elements which will be described below.

The sleeve 22 is connected, preferably constrained, to the central rod 21 in such a way that it is coaxial with the axis X.

As illustrated, the sleeve 22 contains, and in particular surrounds, at least part of said central rod 21.

According to another embodiment, the sleeve 22 is made of plastic material, for example ABS.

According to an embodiment, the sleeve 22 is made of metallic material, for example steel.

According to another aspect, the measuring device 1 comprises a fixing system 3.

Said fixing system 3 is connected, preferably in a movable fashion, to the frame 2.

The fixing system 3 is configured for fixing said measuring device 1 in an integral fashion with said semi-finished component T close to the at least one surface S to be machined.

More specifically, the fixing system 3, being movable between an operating constraining position, in which it keeps the measuring device 1 associated in an integral fashion with the semi-finished component T, and a non-operating position, in which it is possible to associate/disassociate the measuring device 1 to/from said semi-finished component T.

In the embodiment shown in FIGS. 1 to 3, the fixing system 3 comprises a plurality of pairs of arms 30 and a plurality of contact elements 31.

The plurality of contact elements 31 is connected to the plurality of pairs of arms 30.

More specifically, the fixing system 3 comprises a contact element 31 for each pair of arms 30.

Preferably, each contact element 31 is connected to each pair of arms 30 at the point of connection between the two arms making up said pair of arms 30.

In the embodiment illustrated, the contact elements 31 comprise flat elements, designed to make contact with the inner surface of a tubular semi-finished component T for fixing the measuring device 1.

In this embodiment, when the fixing system 3 is in the constrained operating position, the plurality of contact elements 31 is in a position away from the central rod 21.

In the same embodiment, when the fixing system 3 is in the non-operating position, the plurality of contact elements 31 is in a position close to the central rod 21.

In short, the difference between the constraining operating position and the non-operating position lies in the distance of the contact elements 31 from the central rod 21 measured in a plane perpendicular to the axis X of extension of the central rod 21.

Advantageously, with the passage from the non-operating position to the operating constraining position, the contact elements 31 make contact with at least one wall of the semi-finished component T close to the surface S and allow a stable association of the measuring device 1 to the semi-finished component T.

Again according to the embodiment of FIGS. 1 to 3, the fixing system 3 comprises a ring 32.

Said ring 32 is positioned around said central rod 21, that is to say, it is mounted on the central rod 21.

The ring 32 is also movable along the axis X.

Preferably, as illustrated in FIG. 2, each pair of arms 30 comprises a first arm 301 and a second arm 302.

The first arm 301 is hinged to the central rod 21 at a relative first end.

The first arm 301 is hinged to the second arm 302 at a relative second end opposite the first end.

The hinge association between the first arm 301 and the central rod 21, at the first end, or the second arm 302, at the second end, is preferably made by means of a pin passing through slots made in suitable positions in the first arm 301, in the second arm 302 and in the central rod 21.

The second arm 302 is hinged to the ring 32 at a relative first end.

The second arm 302 is hinged to the first arm 301 at a relative second end opposite the first end.

What has been said above for the first arm 301 with regard to the hinge connection by means of pins and slots also applies to the second arm 302.

Advantageously, the association between the second arm 302 and the ring 32, which is movable along the axis X, allows the second arm 302 not only freedom of rotation in a plane in which the axis X and the second arm 302 lie, but also freedom of translation along the axis X.

The hinged association between the first arm 301 and the central rod 21, on the other hand, guarantees to the first arm 301 solely freedom of rotation in a plane in which the axis X and the first arm 301 lie.

In the embodiment illustrated in FIGS. 1 to 3, the fixing system 3 comprises an elastic element 33.

In the embodiment illustrated, the elastic element 33 consists of a compression spring, preferably made of metal.

The elastic element 33 operates between said ring 32 and the rod 21 or an annular contact element slidably associated with said central rod 21.

The elastic element 33, depending on the embodiment, may operate between the ring 32 and the central rod 21 (or an element constrained to the central rod 21) or between the ring 32 and another contact element slidably associated with the central rod 21.

The elastic element 33 is configured to maintain the constraining operating position of the fixing system 3 in the absence of external forces.

These external forces may be supplied by the handling device 100 illustrated in FIGS. 1 to 3.

Said handling device 100 is equipped with a gripper designed to retain the ring 32 or the contact element so as to keep the non-operating position of the fixing system 3 and allows the insertion of the measuring device 1 in a seat of the semi-finished component T.

Once the measuring device 1 has been assembled in the seat of the semi-finished component T, the gripper of the handling device 100 is opened and the elastic element 33 can release an elastic energy stored and move the fixing system 3 to the operating constraining position for an integral association between the measuring device 1 and the semi-finished component T.

Again in the embodiment illustrated in FIGS. 1 to 3, the fixing system 3 comprises an integrated circuit 4.

Said integrated circuit 4 is connected to said frame 2. More specifically, the integrated circuit 4 is connected to the central rod 21.

Advantageously, the use of an integrated circuit 4 allows the overall dimensions of the electronic components of the measuring device 1 to be limited, which may also be applied to semi-finished components T of reduced size.

Preferably, the integrated circuit 4 is contained inside the sleeve 22.

Advantageously, the presence of the sleeve 22, located around the integrated circuit 4, protects the integrated circuit 4 against any impacts.

According to one aspect, the integrated circuit 4 comprises a temperature sensor.

The temperature sensor is configured for measuring at least one temperature parameter of the semi-finished component T.

In particular, the temperature sensor is configured for measuring at least one temperature parameter close to the surface S of the semi-finished component T.

Preferably, the temperature sensor is a contactless infrared temperature sensor.

The temperature sensor is a temperature sensor designed to measure temperature parameters in a range of values which can vary from −70° C. to 380° C.

Advantageously, the temperature sensor is configured to operate in a temperature range of from −40° C. to 125° C.

Preferably, the temperature sensor has a response frequency at least equal to 100 Hz.

Advantageously, a high response frequency makes it possible to measure the fast changes in temperature of the semi-finished component T during the machining performed by the brushes of the at least one group of brushes 10.

According to one embodiment, the temperature sensor is a Hiletgo X90614 sensor.

According to another aspect, the integrated circuit 4 comprises at least one movement sensor.

Said movement sensor is configured for measuring at least one movement parameter of the semi-finished component T.

As specified above, the term "movement parameter" is used to mean translations, vibrations, oscillations and rotations of the semi-finished component T whilst it is transported by the line 11 and is machined by the at least one group of brushes 10.

Preferably, the at least one movement sensor comprises an accelerometer, a gyroscope and a piezoelectric sensor.

The accelerometer is configured for measuring an acceleration parameter of the semi-finished component T, which may be subsequently used for calculating speed and positions of the semi-finished component T.

The gyroscope is configured for measuring a variation parameter of the angular speed of the semi-finished component T, which may be subsequently used for calculating rotations of the semi-finished component T.

The piezoelectric sensor is configured to convert a mechanical energy caused by the movement of the semi-finished component T into electricity for generating signals representing at least one movement parameter.

In one embodiment, the movement sensor comprises an Xtrinsic MMA8451Q sensor and a piezoelectric sensor.

According to another aspect, the integrated circuit 4 comprises a module for communication to a network.

The communication module is configured for sending a signal representing the temperature parameter and movement parameter measured, respectively, by said temperature sensor and movement parameter;

According to an embodiment, the communication module is a Bluetooth type connection module for a wireless connection to a private network (WPAN), in accordance with the IEEE 802.15 standard.

According to another embodiment, the communication module is a connection module of the Wi-Fi type for a wireless connection to a local network (WLAN), in accordance with the IEEE 80211 standard.

According to yet another aspect, the integrated circuit 4 comprises a microcontroller.

The microcontroller is configured for controlling said temperature sensor, movement sensor and communication module.

The microcontroller is configured for sending control signals to said temperature sensor and movement sensor for controlling the measurement at least of the temperature parameter and of the movement parameter.

The microcontroller is also configured for receiving said temperature parameter and movement parameter from said temperature sensor and movement sensor.

The microcontroller is then configured for sending a signal representing said temperature parameter and movement parameter to the communication module, together with control signals for sending said signal to the data acquisition and processing unit 12.

According to an embodiment, the microcontroller consists of an Arduino® Nano V3.

According to another aspect, the integrated circuit 4 comprises a battery.

Said battery is operatively connected to said temperature sensor, movement sensor, communication module and microcontroller.

More specifically, the battery is configured for electrically powering said temperature sensor, movement sensor, communication module and microcontroller.

According to an embodiment, the battery consists of a 3.7 V and 600 mAh battery.

Advantageously, the measuring device 1 according to this invention allows a measurement of the operating parameters of a more efficient machining than the prior art methods, given the possibility of measuring said operating parameters in an almost direct manner on the semi-finished component T.

Moreover, the measuring device 1 is particularly easy to use and intuitive for the user, who can use it nimbly for an optimum setting of the machining.

The invention claimed is:

1. A method for measuring operating parameters of a machining of at least one surface of a semi-finished component comprising:
   providing at least one measuring device including:
   a frame;
   a fixing system, connected to said frame, configured for fixing said at least one measuring device in an integral fashion with said semi-finished component;
   wherein the frame comprises a central rod having a longitudinal axis of extension and a sleeve, connected to said central rod in a coaxial fashion to the longitudinal axis and containing at least part of the central rod;
   wherein the fixing system comprises a plurality of pairs of arms and a plurality of contact elements connected to the plurality of pairs of arms, one contact element for each pair of arms; said fixing system being movable between an operating constraining position, wherein the plurality of contact elements is in a position away from the central rod, and a non-operating position, wherein the plurality of contact elements is in a position toward the central rod;
   wherein the fixing system comprises a ring positioned around said central rod and movable along the longitudinal axis; each pair of arms comprising a first arm having a first end and an opposite second end and a second arm having a first end and an opposite second end, said first arm being hinged to the central rod at the first arm first end and to the second arm at the first arm second end, said second arm being hinged to the ring at the second arm first end and to the second arm at the second arm second end;
   preparing at least one group of brushes for machining surfaces;
   preparing a line for the passage of said semi-finished components comprising at least one surface to be machined with said at least one group of brushes;
   preparing a data acquisition and processor operatively connected to said at least one group of brushes and to said line;
   operatively connecting at least one measuring device in an integral fashion with said semi-finished component adjacent to the at least one surface to be machined;
   positioning on said line said semi-finished component to which the at least one measuring device has been operatively connected;
   machining said at least one surface using said at least one group of brushes;
   measuring, using the at least one measuring device, a plurality of operating parameters of the machining performed during the machining step including at least one temperature parameter of the semi-finished component and at least one movement parameter of the semi-finished component;
   sending, by the at least one measuring device, at least one signal representing said at least one temperature parameter and said at least one movement parameter measured during the measuring step to said data acquisition and processor.

2. The measuring method according to claim 1, comprising a processing, by the data acquisition and processor, said at least one signal representing said at least one temperature parameter and said at least one movement parameter measured in the measuring step.

3. The measuring method according to claim 2, comprising a comparing, by said data acquisition and processor, a result of said processing step.

4. The measuring method according to claim 3, comprising signaling as a function of a result of said comparing.

5. The measuring method according to claim 1, comprising measuring, using the at least one measuring device, said at least one temperature parameter and said at least one movement parameter for at least a part of a duration of the machining.

6. The measuring method according to claim 1, wherein the semi-finished components to be machined are tubular components comprising two end surfaces to be machined and wherein said at least one group of brushes includes two groups of brushed facing each other and preparing said two groups of brushes facing each other for machining the two end surfaces of the tubular semi-finished component.

7. The measuring method according to claim 6, wherein the at least one measuring device includes two measuring devices and positioning the two measuring devices, each adjacent to one of said two end surfaces of the tubular semi-finished component, inside the tubular semi-finished component.

8. A measuring device for measuring operating parameters of a machining of at least one surface of a semi-finished component, the device comprising:
   a frame;
   a fixing system, connected to said frame, configured for fixing said measuring device in an integral fashion with said semi-finished component adjacent to the at least one surface to be machined;

an integrated circuit, connected to said frame, in turn comprising:
  a temperature sensor configured for measuring at least one temperature parameter of the semi-finished component;
  at least one movement sensor configured for measuring at least one movement parameter of the semi-finished component;
  a communication device to a network configured at least for sending a signal representing said at least one temperature parameter and said at least one movement parameter measured, respectively, by said temperature sensor and at least one movement sensor;
  a microcontroller configured for controlling said temperature sensor, said at least one movement sensor and said communication device;
  a battery configured for electrically powering said temperature sensor, said at least one movement sensor, said communication device and said microcontroller;
wherein the frame comprises a central rod having a longitudinal axis of extension and a sleeve, connected to said central rod in a coaxial fashion to the longitudinal axis and containing at least part of the central rod;
wherein the fixing system comprises a plurality of pairs of arms and a plurality of contact elements connected to the plurality of pairs of arms, one contact element for each pair of arms; said fixing system being movable between an operating constraining position, wherein the plurality of contact elements is in a position away from the central rod, and a non-operating position, wherein the plurality of contact elements is in a position toward the central rod;
wherein the fixing system comprises a ring positioned around said central rod and movable along the longitudinal axis; each pair of arms comprising a first arm having a first end and an opposite second end and a second arm having a first end and an opposite second end, said first arm being hinged to the central rod at the first arm first end and to the second arm at the first arm second end, said second arm being hinged to the ring at the second arm first end and to the second arm at the second arm second end.

9. The measuring device according to claim 8, wherein the at least one movement sensor comprises an accelerometer, a gyroscope and a piezoelectric sensor.

10. The measuring device according to claim 8, wherein the communication device includes a Bluetooth circuit configured for a wireless connection to a private network.

11. The measuring device according to claim 8, wherein the integrated circuit is constrained to the central rod and is contained inside the sleeve.

12. The measuring device according to claim 8, wherein the fixing system comprises an elastic element, acting between said ring and the rod or an annular contact element slidable with respect to said rod; said elastic element being configured to maintain the constraining position of the fixing system in an absence of external forces.

13. The measuring device according to claim 8, wherein the communication device includes a WI-FI circuit configured for a wireless connection to a private network.

* * * * *